United States Patent [19]

Swamikannu

[11] Patent Number: 4,880,545

[45] Date of Patent: Nov. 14, 1989

[54] ULTRA-FILTRATION MEMBRANES AND A METHOD FOR THE SEPARATION OF SUGARS USING THE SAME

[75] Inventor: A. Xavier Swamikannu, Des Plaines, Ill.

[73] Assignee: UOP, Des Plaines, Ill.

[21] Appl. No.: 272,971

[22] Filed: Nov. 18, 1988

[51] Int. Cl.[4] .................. B01D 13/00; B01D 13/04
[52] U.S. Cl. ..................... 210/654; 210/500.37; 427/245
[58] Field of Search .............. 210/490, 500.2, 500.41, 210/500.37–500.39, 634, 644, 649, 650, 652, 653, 654, 655; 427/245, 246, 244

[56] References Cited

U.S. PATENT DOCUMENTS 4,005,012 1/1977 Wrasidlo ..................... 210/500.28
4,387,024 6/1983 Kurihara et al. ................. 210/490
4,559,139 12/1985 Uemura et al. .................. 210/490

Primary Examiner—Frank Sever
Attorney, Agent, or Firm—Thomas K. McBride; Raymond H. Nelson

[57] ABSTRACT

Ultra-filtration membranes which may be utilized in a separation process such as the separation of monosaccharides and disaccharides from a mixture of mono- di- and higher polysaccharides will comprise an interfacial polymerized condensation product of the reaction between a polymeric amine produced from the reaction of a polyepihalohydrin and a primary amine containing a hydroxy, alkoxy, or carboxylic radical and a compound selected from the group consisting of aromatic polycarboxylic acid chlorides, alicyclic polycarboxylic acid chlorides, aliphatic polycarboxylic acid chlorides, aromatic polycarboxylic anhydrides and aromatic diisocyanates composited on a porous support bacing material.

22 Claims, No Drawings

ULTRA-FILTRATION MEMBRANES AND A METHOD FOR THE SEPARATION OF SUGARS USING THE SAME

BACKGROUND OF THE INVENTION

Mono- and disaccharides comprise staples in commerce with a wide variety of uses. For example, the aldohexose glucose is used as a sweetener as are the ketohexoses fructose and sorbose. Other monosaccharides, such as for example, the pentoses, arabinose, and xylose, as well as the aforementioned glucose, may be used as a major component of fermentation media. Still other monosaccharides such as mannose, may be reduced to polyols such as mannitol and sorbitol, which then find uses as humectants and excipients in tablets. Furthermore, disaccharides such as maltose also possess a degree of sweetness, especially when in pure form and not contaminated by a reversion product, may also be used as a sweetener.

One derivation of sugar is from cane sugar and sugar beets and is obtained by crushing and extracting the sugar from the cane with water or by extracting the sugar from the sugar beet with water, followed by evaporation and purification with lime absorbent carbon and/or various liquids. The chief component of this type of sugar is sucrose, the other components comprising polysaccharides. In addition, another source of glucose comprises a starch. As is well known, starch is present in many naturally occuring plants including corn, potatoes, rice, tapioca, wheat, etc.

The monosaccharides themselves generally are obtained by hydrolysis of polysaccharides, i.e., polymers having monosaccharides as their repeating units. Hydrolysis of polysaccharides sometimes is chemical, sometimes is enzymatic, and sometimes is a combination of both. For example, hydrolysis of starch, or saccharification as the process more often is called, may be a combination of acid and enzymatic (alpha-amylase) hydrolysis to afford partially hydrolyzed reaction mixture containing some mono-, di-, and trisaccharides, but composed mainly of polysaccharides with 4 or more monomeric units. Polysaccharides composed of n monomeric units often are referred to as having a "degree of polymerization n" or with the notation DPn; in this context partially hydrolyzed starch is mainly DP4, DP5, etc., collectively here designated as DP4+. The partially hydrolyzed starch, or a thinned starch as it is often called, is then further hydrolyzed enzymatically by amyloglucosidase (AG, or glucoamylase) to afford a mixture rich in monosaccharides (DP1), but also containing disaccharides (DP2), trisaccharides (DP3), and higher polysaccharides (DP4+).

In order to obtain pure mono- and disaccharides which, as hereinbefore set forth, are particularly useful as sweeteners, it is necessary to separate them from the tri-, tetra- and higher polysaccharides in an aqueous solution. Among the methods of separation which are particularly utilized to effect this separation is a membrane type separation in which the aqueous solution is passed over the surface of an ultra-filtration membrane in which the membrane possesses a molecular weight cutoff which is low enough to reject materials which possess molecular weights substantially higher than the mono- or disaccharides, but has a molecular weight cutoff high enough to permit the mono- and disaccharides to pass through the membrane at a high flux. The delicate balance between the selectivity of the membrane to reject unwanted components and a flux through the membrane of a permeate rich in mono- and disaccharides which is high enough to render the process commercially feasible has resulted in a continuing development of ultra-filtration membranes which possess the requisite characteristics.

As will hereinafter be shown in greater detail I have now discovered that an ultra-filtration membrane of the type hereinafter set forth in greater detail will permit a separation of mono- and disaccharides from higher polysaccharides whereby the permeate will be enriched in the former and the retentate will contain the latter while allowing the passage of the permeate through the membrane at a commercially feasible rate of reflux.

BRIEF SUMMARY OF THE INVENTION

This invention relates to ultra-filtration membranes and to a process for the separation of sugars, and specifically the separation of mono- and disaccharides from a solution comprising a mixture of monosaccharides, disaccharides, and higher polysaccharides.

Syrups or solutions which are high in glucose and/or maltose concentration comprise desirable chemical entities. By utilizing these syrups or solutions which contain a high glucose or maltose content for sweetening processes such as in baking goods, candies, etc., it is possible to utilize lesser amounts of these syrups, thereby concomitantly reducing the overall cost of the finished product.

It is therefore an object of this invention to provide an ultra-filtration membrane which possesses the desirable characteristics of a high rejection rate of polysaccharides and a high flux.

A further object of this invention is to provide a process for the separation of monosaccharides and disaccharides from solutions comprising a mixture of monosaccharides, disaccharides and higher polysaccharides.

In one aspect an embodiment of this invention resides in an ultra-filtration membrane comprising a porous support backing material having composited thereon an interfacial polymerized condensation product of the reaction between a polymeric amine produced from the reaction between a polyepihalohydrin and a primary amine containing a substituent selected from the group consisting of hydroxy, alkoxy and carboxyl radicals and a compound selected from the group consisting of aromatic polycarboxylic acid chlorides, alicyclic polycarboxylic acid chlorides, aliphatic polycarboxylic acid chlorides, aromatic polycarboxylic acid anhydrides and aromatic diisocyanates.

A further object of this invention is found in a process for the preparation of an ultra-filtration membrane which comprises casting an aqueous solution of a polyamine which is prepared by reacting a polyepihalohydrin with a primary amine containing a substituent selected from the group consisting of hydroxy, alkoxy and carboxyl radicals on a porous support backing material, removing excess solution, contacting said coated support material with an organic solvent solution of a compound selected from the group consisting of aromatic polycarboxylic acid chlorides, alicyclic polycarboxylic acid chlorides, aliphatic polycarboxylic acid chlorides, aromatic polycarboxylic acid anhydrides and aromatic diisocyanates to form an interfacial polymerized condensation product membrane on the surface of said porous support backing material, curing the resultant composite at curing conditions, and recovering the resultant ultra-filtration membrane.

Yet another embodiment of this invention resides in a process for the separation of monosaccharides and disaccharides from a solution containing a mixture of monosaccharides, disaccharides and higher polysaccharides, which comprises contacting the upstream face of an ultra-filtration membrane comprising a porous support backing material having composited thereon an interfacial polymerized condensation product of the reaction between a polymeric amine produced from the reaction between a polyepihalohydrin and a primary amine containing a substituent selected from the group consisting of hydroxy, alkoxy and carboxyl radicals and a compound selected from the group consisting of aromatic polycarboxylic acid chlorides, alicyclic polycarboxylic acid chlorides, aliphatic polycarboxylic acid chlorides, aromatic polycarboxylic acid anhydrides and aromatic diisocyanates, with said solution at separation conditions, and recovering the permeate, after passage through said membrane, which comprises a mixture of monosaccharides and disaccharides.

A specific embodiment of this invention resides in an ultra-filtration membrane comprising a porous support backing material consisting of polysulfone having composited thereon an interfacial polymerized condensation product of the reaction between a polymeric amine produced from the reaction between polyepichlorohydrin and monoethanolamine and an aromatic polycarboxylic acid chloride comprising trimesoyl chloride.

Another specific embodiment of this invention is found in a process for the preparation of an ultra-filtration membrane which comprises casting an aqueous solution of a polyamine prepared by reacting polyepichlorohydrin with monoethanolamine on a porous support backing material comprising polysulfone, removing excess solution, contacting said coated support material with a hexane solution of trimesoyl chloride to form an interfacial polymerized condensation product membrane on the surface of the polysulfone, curing the resultant composite at a temperature in the range of from about 25° to about 150° C. for a period of time in the range of from about 10 minutes to about 2 hours, and recovering the resultant ultra-filtration membrane.

Yet another specific embodiment of this invention is found in a process for the separation of monosaccharides and disaccharides from a solution containing a mixture of monosaccharides, disaccharides and higher polysaccharides which comprises contacting the upstream face of an ultra-filtration membrane comprising a porous support backing material consisting of polysulfone having composited thereon an interfacial polymerized condensation product of the reaction between a polymeric amine produced from the reaction between polyepichlorohydrin and monoethanolamine with trimesoyl chloride, the separation conditions which include a temperature in the range of from about 25° to about 75° C. and a pressure in the range of from about 100 to about 500 psig, and recovering the permeate which comprises a mixture of monosaccharides and disaccharides.

Other objects and embodiments will be found in the following more detailed description of the invention.

DETAILED DESCRIPTION OF THE INVENTION

As hereinbefore set forth, the present invention is concerned with an ultra-filtration membrane as well as a process for the separation of these membranes and a method for the separation of sugars which utilizes the membranes. The ultra-filtration membranes are prepared by casting an aqueous solution of a polymeric amine which is produced from the reaction between a polyepihalohydrin and a primary amine containing a substituent selected from the group consisting of hydroxy, alkoxy and carboxyl radicals on a porous support backing material, removing excess solution and thereafter contacting the coated support material with an organic solvent solution of the compound selected from the group consisting of aromatic polycarboxylic acid chloride, alicyclic polycarboxylic acid chloride, aliphatic polycarboxylic acid chloride, aromatic polycarboxylic anhydrides and aromatic diisocyanates to form an interfacial condensation reaction product on the surface of the porous support backing material. The organic solvent which is used to prepare the solution of the polycarboxylic acid or aromatic diisocyanate compounds is immiscible with the aqueous solution to thus permit the formation of interfacial polymerized condensation reaction products. Following this, the resulting composite is then cured at conditions hereinafter set forth in greater detail to provide an ultra-filtration membrane which exhibits favorable characteristics with respect to rejection of high polysaccharides and flux.

The polymeric amine which forms one component of the ultra-filtration membrane is produced by reacting a polyepihalohydrin such as polyepichlorohydrin, polyepibromohydrin or polyepiiodtohydrin with a primary amine which contains a substituent selected from the group consisting of hydroxy, alkoxy and carboxyl radicals. Some specific examples of these primary amines comprise those containing from 2 to about 6 carbon atoms such as ethanolamine, 2-propanolamine, 3-propanolamine, 2-butanolamine, 3-butanolamine, 4-butanolamine, the isomeric pentanol- and hexanolamines, 2-methoxyethylamine, 2-methoxypropylamine, 3-methoxypropylamine, 2-methoxybutylamine, 3-methoxybutylamine, 4-methoxybutylamine, the isomeric methoxypentylamines and hexylamines, 2-ethoxyethylamine, 2-ethoxypropylamine, 3-ethoxypropylamine, 2-ethoxybutylamine, 3-ethoxybutylamine, 4-ethoxybutylamine, aminoethylethylene glycol, aminopropylpropylene glycol, amino acids such as alanine, glycine, glutamine, leucine, etc. The presence of the hydroxy alkoxy or carboxyl group on the alkyl moiety of the amine will be beneficial in that it will impart water solubility to the polymeric amine as well as producing membranes with high water permeability. The former characteristic is desirable in that it will result in a membrane casting solution which is easy to handle.

The reaction between the polyepihalohydrin and the primary amine, the examples of said compounds serving merely for purposes of illustration and not being intended to limit the present invention thereof, is effected at reaction conditions which include a temperature in the range of from about 0° to about 200° C. and a pressure in the range of from about atmospheric to about 1,000 psig. The particular reaction conditions which are employed to form the desired polymeric amine will be dependent upon the particular reactants undergoing condensation.

The second component will be utilized to form the interfacial condensation reaction product and will comprise a cross-linking agent which may be selected from the compounds in the group of aromatic polycarboxylic acid chlorides, alicyclic polycarboxylic acid chlorides, aliphatic polycarboxylic acid chlorides, aromatic polycarboxylic anhydrides and aromatic diisocyanates. Some specific examples of these compounds which may be used in the process of the present invention, but which are not intended to be limited thereto, will include adipoyl chloride, succinyl chloride, oxalyl chloride, cyclohexanetricarbonyl chloride, methylcyclohexanetricarbonyl chloride, cyclopentanetricarbonyl chloride, methylcyclopentanetricarbonyl chloride, terephthalyl chloride, isophthalyl chloride, trimesoyl chloride, benzenetetracarboxylic anhydride acid chloride, trimellitic dianhydride acid chloride, benzenetrisulfonyl chloride, benzenedisulfonyl chloride, 2,4-toluene diisocyanate, 2,6-toluene diisocyanate, methylenediphenyl isocyanate, etc.

As hereinbefore set forth, the polymeric amine is prepared by reacting a polyepihalohydrin and a primary amine in which the primary amine of the type hereinbefore described is present in the reaction mixture in an excess of from about 1:1 to about 1:10 moles of primary amine per mole of polyepihalohydrin. The reaction may be effected for a period of time ranging from about 1 to about 10 hours or more in duration, said time being dependent upon the particular temperature and pressure which is utilized to effect the reaction. Upon completion of the desired residence time the product comprising the polymeric amine is treated by conventional means such as the addition of a basic substance such as sodium hydroxide to remove the halogen formed by the reaction and purified.

The ultra-filtration membrane of the present invention may then be prepared by coating a porous support backing material, examples of which may include such polymers as polysulfone, polycarbonate, microporous polypropylene, the various polyamides, polyphenylene ether, etc. with an aqueous solution of the polymeric amine. The aqueous solution which is utilized to coat the porous support backing material may comprise a solution in which the polymeric amine is present in an amount in the range of from about 0.1 up to about 5% by weight of the solution. The porous support backing material will contain pore sizes which are sufficient to permit the passage of permeate therethrough but are not large enough so as to interfere with the bridging over of the resultant interfacial polymerized condensation reaction product which forms the ultra-filtration membrane. In the present embodiment of the invention the pore sizes of the porous support backing material may range from about 1 to about 1,000 millimicrons inasmuch as pores which are larger than 1,000 millimicrons will permit the ultrafiltration membrane to sag into the pore, thus disrupting the flat sheet configuration which is a desirable characteristic of the membrane.

The porous support backing material may be coated with the aqueous solution of the polymeric amine by utilizing either handcasting or continuous operation.

When utilizing a handcasting operation the porous support backing material which has been coated with the aqueous solution of the polymeric amine is placed in a vertical position so that the excess solution is drained therefrom. Following this the coated support material is then contacted with an organic solvent solution of the cross-linking agent of the type hereinbefore set forth in greater detail. Again, in a preferred embodiment of the invention, the cross-linking agent is present in the organic solvent solution in the range of from about 0.1 to about 5% by weight of the solution. Some representative examples of organic solvents which may be employed in the process of this invention will comprise paraffins such as n-pentane, n-hexane, n-heptane, etc., cycloparaffins such as cyclopentane, cyclohexane, methylcyclopentane, etc., or a halogenated solvent such as trichlorotrifluoroethane.

Inasmuch as the organic solvent solution of the cross-linking agent and the aqueous solvent solution of the polymeric amine are substantially immiscible or incompatible, the polymerization of the two components of the membrane will occur substantially only to the interface between the solvent phases and thus an interfacially polymerized condensation product comprising an ultra-filtration membrane will be formed thereat. The contact time required for the formation of the thin film membrane will fluctuate over a relatively wide range of from about 1 second to about 60 seconds. Following the formation of the interfacially polymerized reaction product on the surface of the porous support backing material, the resultant composite may be cured to remove any remaining solvent and firmly affix the thin film membrane on the surface of the support. The curing of the composite membrane may be effected over a wide temperature range, said temperature being from ambient (20°–25° C.) up to about 150° C. for a period of time ranging from about 1 minute to about 2 hours or more in duration. The operating parameters of time and temperature will be interdependent, the primary criteria for the curing of the membrane being that said curing time is sufficient to provide the desired membrane but being insufficient to affect the desired characteristics of the thin film membrane and the porous backing support material. For example, excessive heat or curing time may affect the pore size of the backing material, thus resulting in a decrease of the desired flux rate of the membrane.

It is also contemplated within the scope of this invention that the ultra-filtration membrane may be prepared in a continuous manner of operation. When this type of operation is employed, a porous support backing material of the type hereinbefore set forth in greater detail is continuously passed through a bath of an aqueous solution of the polymeric amine. After passage through the bath, the backing material is continuously withdrawn and, if so desired, passed between rollers in order to remove any excess solution which may be present. The coated support material is then also continuously passed through the solution of the cross-linking agent in an organic solvent. The interfacial polymerization reaction will occur during the contact time between the solutions following which the composite comprising the interfacial polymerized reaction product in the form of a thin film semipermeable membrane on the porous support backing material will then be cured as, for example, by passage through an oven which is maintained at a desired curing temperature, the passage through said oven being at a predetermined rate so as to avoid any possible damage to the composite membrane.

While the above discussion concerning the preparation of a membrane has been centered on a flat sheet type of configuration, it is also possible to form the membrane in the shape of a hollow fiber. When such a type of configuration is desired, an aqueous solution of the polymeric amine may be pumped into a hollow fiber comprising the porous support backing material and the excess solution is then drained off. Following this the organic solvent solution of the cross-linking agent may then be pumped into the fiber for a predetermined period of time and the excess solution then drained off. The resulting interfacially formed membrane on the hollow fiber module may then be heated to complete the curing of the membrane.

The process involving the separation of monosaccharides and disaccharides from higher oligomers may be effected in any suitable manner known in the art. The particular apparatus which is employed in the separation process may involve the use of the membranes, which are in the form of flat sheets, either in modules as a single sheet or multiple sheet units, whereby the sheets are wound in spiral type configuration. The process is effected by charging a feedstock comprising a mixture of monosaccharides, disaccharides, and higher polysaccharides containing a degree of polymerization from DP4 up to about DP9+ at separation conditions over the upstream face of an ultra-filtration membrane of the present invention. The separation conditions which are employed in the process of this invention will include a temperature in the range of from about 25° to about 75° C. and a pressure in the range of from about 1 to about 500 pounds per square inch gauge (psig). After passage over and through the ultra-filtration membrane for a predetermined period of time the permeate comprising a mixture consisting primarily of monosaccharides and disaccharides is recovered and passed to storage while the retentate which comprises a mixture of higher polysaccharides containing a degree of polymerization within the range hereinbefore set forth is recovered and, if so desired, recycled to the feedstream for further treatment and separation.

In the preferred embodiment of the invention the process is effected in a continuous manner of separation although it is also contemplated within the scope of this invention that the separation process may be effected in a batch type operation.

The following examples are given for purposes of illustrating the ultra-filtration membrane, a process for the preparation of these membranes as well as a process for the separation of sugars. However, it is to be understood that these examples are given merely for the purpose of illustration and that the present invention is not necessarily limited thereto.

EXAMPLE I

This example is given to show a method for preparing the polymeric amine which comprises 1 component of the ultra-filtration membrane of the present invention. The polymeric amine was prepared by adding 27.2 g (0.294 mol) of polyepichlorohydrin to a stirred flask containing a 40 mL (6.48 mol) of monoethanolamine. The mixture was heated to a temperature of 135° C. for a period of 4 hours, at the end of which time heating was discontinued and the flask was allowed to return to room temperature. The yellow liquid comprising the reaction product was evaporated on a rotary evaporator and 65.7 g of a viscous liquid was obtained. The liquid was placed in a flask and 250 mL of deionized water, along with 44 mL of a 25% sodium hydroxide solution were added. After thorough admixture the solution was evaporated again on a rotary evaporator to obtain a yellow slurry. Following this 250 mL of ethyl alcohol were added to the product with thorough admixture by means of stirring. A white precipitate comprising sodium chloride was removed by filtration and the filtrate was evaporated to obtain the desired product comprising poly(epiethanolamine). The product was subjected to infrared and 13 CNMR spectra which confirm the structure of the product. The spectra indicated that small quantities of monoethanolamine was still present in the product. The product was purified by washing with 150 mL of methylene chloride and thereafter was dried under vacuum.

EXAMPLE II

This example illustrates the preparation of an ultra-filtration membrane of the present invention, the membrane prepared by dissolving the poly(epiethanolamine) in a sufficient amount of deionized water to give a 1% by weight solution of the polyamine. A 5"×7" sheet of microporous polysulfone was taped to the side of a glass plate and immersed in the amine solution for a period of 1 minute. The amine soaked polysulfone was allowed to stand in a vertical position until the excess amine was completely drained off. The aqueous layer between the support and the glass plate was removed by drying and the treated polysulfone was retaped to the glass plate.

The treated polysulfone was then immersed in a vertical position into a tank containing a solution comprising 0.23% weight by volume of trimesoyl chloride in hexane for a period of 10 seconds. The plate was removed, the excess hexane solution was allowed to drain for a period of time and thereafter the membrane was cured in an oven maintained at a temperature ranging from 60° to 65° C. for a period of 20 minutes.

EXAMPLE III

This example illustrates a proces for the separation of monosaccharides and disaccharides from a mixture comprising monosaccharides, disaccharides, trisaccharides and tetrasaccharides. The separation was accomplished by cutting three pieces of membrane from 5"×7" sheet, which were labeled A, B and C, and placing them in a separation apparatus. The feedstock was passed over the upstream face of the membranes at a temperature of 60° C. and an implied pressure of 150 psig. The mixture was allowed to flow over the surface of the membrane for a period of 27 hours at the end of which time the permeate was collected and analyzed by means of high pressure liquid chromatography. The results of these tests are set forth in Table 1 below.

TABLE 1

| Membrane | Percent Composition | | | |
|---|---|---|---|---|
| | DP1 | DP2 | DP3 | DP4 |
| Feed | 77 | 6.3 | 2.7 | 14.0 |
| A | 90.2 | 6.2 | 2.0 | 1.6 |
| B | 91.6 | 5.9 | 1.7 | 0.8 |
| C | 93.2 | 5.3 | 1.2 | 0.3 |

It will be noted from the above table that the amount of DP1 showed a dramatic increase in the permeate when compared to the feed, while the amount of DP2 remained substantially the same. In addition, the amount of DP3 and DP4 present in the permeate showed a dramatic decrease when compared to that of the feedstock.

EXAMPLE IV

The separation of sugars was effected for a period of 188 hours. During this test period permeate and feed samples were collected at various intervals and analyzed. The results of these analyses are set forth in Tables 2 and 3 below.

TABLE 2

| PERMEATE FLUXES (GFD) | | | | | | |
|---|---|---|---|---|---|---|
| Hours | | | | | | |
| 1 | 20 | 27 | 48 | 74 | 118 | 188 |
| 13.6 | 9.5 | 9.3 | 7.8 | 6.4 | 6.3 | 7.6 |
| 16.9 | 12.1 | 12.1 | 10.8 | 10.1 | 10.0 | 11.6 |
| 16.1 | 12.1 | 11.0 | 8.8 | 8.9 | 7.7 | 7.6 |

TABLE 3

| | SOLIDS CONTENTS | | | | | | |
|---|---|---|---|---|---|---|---|
| | Hours | | | | | | |
| | 1 | 20 | 27 | 48 | 74 | 118 | 188 |
| | 22.9 | 24.0 | 23.7 | 24.2 | 23.0 | 23.7 | 22.7 |
| | 23.0 | 24.1 | 23.5 | 24.2 | 22.3 | 23.3 | 22.1 |
| | 25.0 | 25.4 | 25.1 | 26.2 | 24.4 | 25.5 | 24.3 |
| Feed | 29.8 | 30.7 | 29.8 | 31.1 | 29.7 | 30.1 | 29.7 |

It should be noted from the above tables that after a period of 188 hours the fluxes of the membranes had been reduced, the decrease in permeate flux being due to a buildup of sugars on the surface of the membrane which can be removed by washing with water. In spite of the decrease however, the flux at the end of the 188 hour period still remained within an acceptable range.

In addition, it is also noted that the solids content of the permeate remained at an almost constant rate. This signifies that the membrane retained its integrity during the reaction period and was not plasticized nor degraded. This stability of the membrane constitutes an important and desired characteristic which enables a separation process to be effeced for a long period of time without the necessity for replacing a membrane.

I claim as my invention:

1. An ultra-filtration membrane comprising structure for achieving a delicate balance between selectivity and water reflux in the separation of preselected water soluble components consisting essentially of a porous support backing material having composited thereon an interfacial polymerized condensation product of the reaction between a polymeric amine produced from the reaction between a polyepihalohydrin and a primary amine containing a substituent selected from the group consisting of hydroxy, alkoxy and carboxyl radicals and a compound selected from the group consisting of aromatic polycarboxylic acid chlorides, alicyclic polycarboxylic acid chlorides, aliphatic polycarboxylic acid chlorides, aromatic polycarboxylic acid anhydrides and aromatic diisocyanates.

2. The membrane of claim 1 in which said polyepihalohydrin is polyepichlorohydrin.

3. The membrane of claim 1 in which said polyepihalohydrin is polyepibromohydrin.

4. The membrane of claim 1 in which said polyepihalohydrin is polyepiiodohydrin.

5. The membrane of claim 1 in which said primary amine is an alkanol amine containing from 2 to about 6 carbon atoms.

6. The membrane as set forth in claim 5 in which said alkanol amine is monoethanol amine.

7. The membrane as set forth in claim 5 in which said alkanol amine is monopropanol amine.

8. The membrane as set forth in claim 1 in which said primary amine is methoxyethyl amine.

9. The membrane as set forth in claim 1 in which said primary amine is aminoethylethylene glycol.

10. The membrane as set forth in claim 1 in which said primary amine comprises an amino acid.

11. The membrane as set forth in claim 10 in which said amino acid is D-alanine.

12. The membrane as set forth in claim 1 in which said aromatic polycarboxylic acid chloride is trimesoyl chloride.

13. The membrane as set forth in claim 1 in which said aromatic polycarboxylic acid chloride is terephthalyl chloride.

14. The membrane as set forth in claim 1 in which said aromatic diisocyanate is 2,4-toluene diisocyanate.

15. A process for the preparation of an ultra-filtration membrane which comprises casting an aqueous solution of a polyamine which is prepared by reacting a polyepihalohydrin with a primary amine containing a substituent selected from the group consisting of hydroxy, alkoxy and carboxyl radicals on a porous support backing material, removing excess solution, contacting said coated support material with an organic solvent solution of a compound selected from the group consisting of aromatic polycarboxylic acid chlorides, alicyclic polycarboxylic acid chlorides, aliphatic polycarboxylic acid chlorides, aromatic polycarboxylic acid anhydrides and aromatic diisocyanates to form an interfacial polymerized condensation product membrane on the surface of said porous support backing material, curing the resultant composite at curing conditions, and recovering the resultant ultra-filtration membrane consisting essentially of structure for achieving a delicate balance between selectivity and water flux in the separation of preselected water soluble component.

16. The process as set forth in claim 15 in which said curing conditions include a temperature in the range of from about 25° to about 150° C. for a period of time in the range of from about 10 minutes to about 2 hours.

17. The process as set forth in claim 15 in which said polyepihalohydrin and said primary amine are reacted at a pressure in the range of from about atmospheric to about 1,000 psig and a temperature in the range of from about 0° to about 200° C.

18. The process as set forth in claim 15 in which said polyepihalohydrin is polyepichlorohydrin, said primary amine is monoethanol amine and said aromatic polycarboxylic acid chloride is trimesoyl chloride.

19. The process as set forth in claim 15 in which said polyepihalohydrin is polyepichlorohydrin, said primary amine is aminoethylethylene glycol and said aromatic polycarboxylic acid chloride is trimesoyl chloride.

20. The process as set forth in claim 15 in which polyepihalohydrin is polyepibromohydrin, said primary amine is methoxyethylamine and said aromatic diisocyanate is 2,4-toluene diisocyanate.

21. A process for the separation of monosaccharides and disaccharides from a solution containing a mixture of monosaccharides, disaccharides and higher polysaccharides, which comprises contacting the upstream face of an ultrafiltration membrane comprising structure for achieving a delicate balance between selectivity and water flux in the separation of preselected water soluble components consisting essentially of a porous support backing material having composited thereon an interfacial polymerized condensation product of the reaction between a polymeric amine produced from the reaction between a polyepihalohydrin and a primary amine containing a substituent selected from the group consisting of hydroxy, alkoxy and carboxyl radicals and a compound selected from the group consisting of aromatic polycarboxylic acid chlorides, alicyclic polycarboxylic acid chlorides, aliphatic polycarboxylic acid chlorides, aromatic polycarboxylic acid anhydrides and aromatic diisocyanates, with said solution at separation conditions, and recovering the permeate, after passage through said membrane, which comprises a mixture of monosaccharides and disaccharides.

22. The process as set forth in claim 21 in which said separation conditions include a temperature in the range of from about 25° to about 75° C. and a pressure in the range of from about 100 to about 500 psig.

* * * * *

UNITED STATES PATENT AND TRADEMARK OFFICE
CERTIFICATE OF CORRECTION

PATENT NO.   : 4,880,545
DATED        : November 14, 1989
INVENTOR(S)  : Swamikannu It is certified that error appears in the above-identified patent and that said Letters Patent is hereby corrected as shown below:

In Column 9, line 38:  Change "reflux" to --flux--.

Signed and Sealed this

Fifteenth Day of January, 1991

Attest:

HARRY F. MANBECK, JR.

*Attesting Officer*            *Commissioner of Patents and Trademarks*